United States Patent
Janssen et al.

(10) Patent No.: US 9,494,046 B2
(45) Date of Patent: Nov. 15, 2016

(54) METHOD FOR OPERATING A ROTARY MACHINE

(75) Inventors: Stefan Janssen, Essen (DE); Michael Kursch, Mulheim an der Ruhr (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 343 days.

(21) Appl. No.: 14/233,514

(22) PCT Filed: Jul. 23, 2012

(86) PCT No.: PCT/EP2012/064411
§ 371 (c)(1),
(2), (4) Date: Jan. 17, 2014

(87) PCT Pub. No.: WO2013/011150
PCT Pub. Date: Jan. 24, 2013

(65) Prior Publication Data
US 2014/0147247 A1    May 29, 2014

(30) Foreign Application Priority Data
Jul. 21, 2011    (EP) .................... 11174791

(51) Int. Cl.
*F01D 25/16*    (2006.01)
*F16C 25/02*    (2006.01)
*F01D 3/04*    (2006.01)
(Continued)

(52) U.S. Cl.
CPC .............. *F01D 25/16* (2013.01); *F01D 3/04* (2013.01); *F01D 25/168* (2013.01); *F16C 17/04* (2013.01); *F16C 17/243* (2013.01); *F16C 25/02* (2013.01); *F05D 2240/53* (2013.01); *F16C 2360/23* (2013.01)

(58) Field of Classification Search
CPC ........ F01D 25/16; F01D 25/168; F01D 3/04; F16C 25/02; F16C 17/04; F16C 17/243; F16C 2360/23; F05D 2240/53
USPC ................ 415/104, 106, 107, 110–113, 229; 384/121
See application file for complete search history.

(56) References Cited

U.S. PATENT DOCUMENTS

| 3,192,000 A | * | 6/1965 | Williams | ................ F16C 17/04 384/125 |
| 3,895,689 A | * | 7/1975 | Swearingen | .......... F01D 25/168 184/6.16 |
| 4,273,390 A | * | 6/1981 | Swearingen | ............ F16C 17/24 384/307 |

(Continued)

FOREIGN PATENT DOCUMENTS

| CN | 1711429 A | 12/2005 |
| CN | 1784539 A | 6/2006 |

(Continued)

*Primary Examiner* — Hoang Nguyen
(74) *Attorney, Agent, or Firm* — Beusse Wolter Sanks & Maire

(57) ABSTRACT

A method for operating a rotary machine with a rotor that is mounted in a bearing is provided. The rotor is subjected to a thrust that acts substantially in only an axial direction during the operating time. The thrust is received and dissipated by a first thrust bearing of the bearing via sliding means, the bearing having a second thrust bearing. The axial vibrations of the rotor are damped or completely prevented by means of the second thrust bearing generating a force that acts on the first thrust bearing in the direction of the thrust at least temporarily at the same time as the thrust occurs.

14 Claims, 4 Drawing Sheets

(51) Int. Cl.
*F16C 17/04* (2006.01)
*F16C 17/24* (2006.01)

(56) References Cited

U.S. PATENT DOCUMENTS

| | | | |
|---|---|---|---|
| 4,804,905 A | 2/1989 | Ding et al. | |
| 5,219,447 A | 6/1993 | Arvidsson | |
| 5,248,239 A * | 9/1993 | Andrews | F01D 3/00 415/104 |
| 5,735,676 A * | 4/1998 | Loos | F01D 25/18 184/104.1 |
| 5,795,073 A | 8/1998 | Arvidsson et al. | |
| 6,067,791 A | 5/2000 | Patel | |
| 7,018,165 B2 | 3/2006 | Milazar | |
| 7,108,488 B2 | 9/2006 | Larue et al. | |
| 7,862,238 B2 | 1/2011 | Itou | |
| 7,946,770 B2 | 5/2011 | Hayashi | |
| 8,215,842 B2 | 7/2012 | Maruyama et al. | |
| 2002/0009361 A1 | 1/2002 | Reichert | |
| 2007/0025839 A1 | 2/2007 | Ceric | |

FOREIGN PATENT DOCUMENTS

| | | |
|---|---|---|
| CN | 101046224 A | 10/2007 |
| CN | 101383536 A | 3/2009 |
| CN | 101498339 A | 8/2009 |
| EP | 149875 A1 | 11/2004 |
| EP | 1479875 A1 | 11/2004 |
| FR | 2251744 A1 | 6/1975 |
| JP | H0266316 A | 3/1990 |
| JP | 2001526344 A | 12/2001 |
| JP | 2002095212 A | 3/2002 |
| JP | 2002529646 A | 9/2002 |
| JP | 2005121114 A | 5/2005 |
| JP | 2006528305 A | 12/2006 |
| WO | 9102174 A1 | 2/1991 |
| WO | 0028190 A1 | 5/2000 |
| WO | 0204827 A1 | 1/2002 |
| WO | 2009083789 A1 | 7/2009 |

* cited by examiner

METHOD FOR OPERATING A ROTARY MACHINE

CROSS REFERENCE TO RELATED APPLICATIONS

This application is the US National Stage of International Application No. PCT/EP2012/064411 filed Jul. 23, 2012, and claims the benefit thereof. The International Application claims the benefit of European Application No. EP11174791 filed Jul. 21, 2011. All of the applications are incorporated by reference herein in their entirety.

FIELD OF INVENTION

The invention relates to a rotary machine.

BACKGROUND OF INVENTION

A generic rotary machine is described for example in WO 00/28190 A1. In said publication, the rotary machine is a gas turbine of axial type of construction, having the commonly provided components of compressor, combustion chamber, turbine and a common rotor for the compressor and turbine. The known gas turbine comprises a compressor-side axial bearing with a main step and a secondary step for the axial positioning of the gas turbine rotor. The main step and secondary step may in this case bear against a side surface of a respective shaft collar so as to form a hydrodynamic slide film of hydraulic oil. Which of the two steps predefines the axial position of the rotor is in this case dependent on the operating point. A suitable hydraulic controller for this is known from EP 1 479 875 A1. Here, by means of a 4/2 directional valve, it is possible for either the main step or the secondary step to be pressurized depending on whether or not the rotor is to be displaced axially.

Alternative axial bearings to this emerge from WO 91/02174 A1 and from U.S. Pat. No. 5,795,073.

During intended operation of the gas turbine, the side surface of the first shaft collar bears against the main step of the axial bearing because the flow forces of the hot gas which act axially on the rotor in the region of the turbine are greater than the flow forces in the compressor, and thus displace the rotor constantly from the compressor in the direction of the turbine unit. The secondary step is situated in the force flow of the axial bearing instead of the main step when the rotor of the gas turbine is accelerated from a standstill to rated rotational speed. During said run-up, there is a resultant axially acting thrust force on the gas turbine rotor directed oppositely to the operational thrust force, specifically from the turbine unit in the direction of the compressor. Just before the rated rotational speed is reached, the present thrust direction changes abruptly, such that the axial positioning of the rotor then changes from the secondary step to the main step.

The already-known axial bearing is furthermore equipped with axially displaceable bearing elements in order for the rotor to be displaced counter to the flow direction of the hot gas, and thus for radial gaps in the turbine between the rotor blade tips and a housing wall situated opposite these to be minimized, during the steady-state operation of the gas turbine.

It has been found that, during the operation of the gas turbine, operating states may arise which lead to axial vibrations of the rotor. These axial vibrations can, in the worst case, lead to damage to the axial bearing or to components in the force flow if the amplitudes of the axial vibrations exceed a critical magnitude. The axial vibrations are usually caused by an unstable combustion process taking place within the combustion chamber. The causes of the instability are often manifold and not causally predictable.

SUMMARY OF INVENTION

It is therefore an object of the invention to provide a method for operating a rotary machine, in which method the axial vibrations of the rotor are damped or even eliminated.

This object is achieved, with regard to the method, by means of a method as per the features described herein. Advantageous refinements and further features of the invention are also specified herein.

In the method according to the invention for the operation of a rotary machine having a rotor which is mounted in a bearing, which rotor is, at a time during operation, subjected to a thrust force which acts substantially only in an axial direction, that is to say main thrust direction, said thrust force being absorbed and dissipated by a first step bearing of the bearing via sliding means, wherein the bearing has a second step bearing, it is provided that, as the thrust force acts, the second step bearing is at least temporarily simultaneously activated so as to generate, via the rotor, a force that acts on the first step bearing in the main thrust direction.

The inventors have identified that, by means of the respectively unloaded step—that is to say the second step bearing—it is possible, in the event of axial vibrations, for the second step bearing to also be placed in engagement with the rotor, and for damping of the axial vibrations to thereby be realized by means of the reduction of the axial play at the loaded, that is to say first, step bearing. In this respect, despite the presence of a thrust force acting in only one axial direction at the time, the rotor of the rotary machine is additionally subjected to a further force acting in the same direction in order to reduce the tendency of the rotor to vibrate. Even though, as a result, the first step bearing is subjected to a higher force than that generated by the thrust force, this normally does not cause the first step bearing to be overloaded. It can be ensured by means of the method that, although the cause of the axial vibrations of the rotor is not significantly changed, the characteristics of said vibrations are significantly changed: the amplitude of the axial vibrations is limited. This reliably prevents damage to the bearing or to components situated in the force flow.

The bearing and thus the two step bearings are preferably each in the form of hydrodynamic plain bearings in which the force-fitting coupling of step bearing and rotor is achieved by means of the feed of a hydraulic oil into the axial gap present between the step bearing and rotor.

The method is particularly preferably implemented during a transient operating state and/or during part-load operation of a rotary machine in the form of a turbomachine. In particular in the case of static gas turbines, in which the rotor is normally acted on by a thrust force acting in an axial direction, axial vibrations can arise in transient operating states such as for example the start-up of the gas turbine from a standstill to rated rotational speed. Such vibration states may also arise in low part-load operation. In this respect, it is advantageous for the second step bearing to also be connected in a force-fitting manner to the rotor only during said operating states. Normally, in full-load operation, only the first step bearing and not the second step bearing is coupled in a force-fitting manner to the rotor, because axial vibrations generally do not arise in said operating state. This saves the energy required for supplying hydraulic medium to the second step bearing.

It is furthermore preferable for the axial vibrations of the rotor to be detected by means of a measurement sensor and compared with a threshold value. The proposed damping of the rotor is preferably activated, by virtue of the second step bearing simultaneously being activated so as to generate via the rotor a force that acts on the first step bearing in the main thrust direction, only in the event of the threshold value being exceeded.

The method may self-evidently also be implemented before, during and/or after an axial displacement of the rotor.

The invention will be described below on the basis of a hydraulic axial bearing. It is self-evidently also possible for the two steps of the axial bearing to be replaced by two oppositely acting magnetic axial bearings which, corresponding to the invention, can simultaneously generate opposed thrust forces on the bearing to be mounted when axial vibrations arise.

BRIEF DESCRIPTION OF THE DRAWINGS

Further advantages and features of the invention will emerge from an exemplary embodiment which is described in more detail in the appended figures, in which.

In all of the figures, identical features are denoted by the same reference signs.

DETAILED DESCRIPTION OF INVENTION

Figure 1:
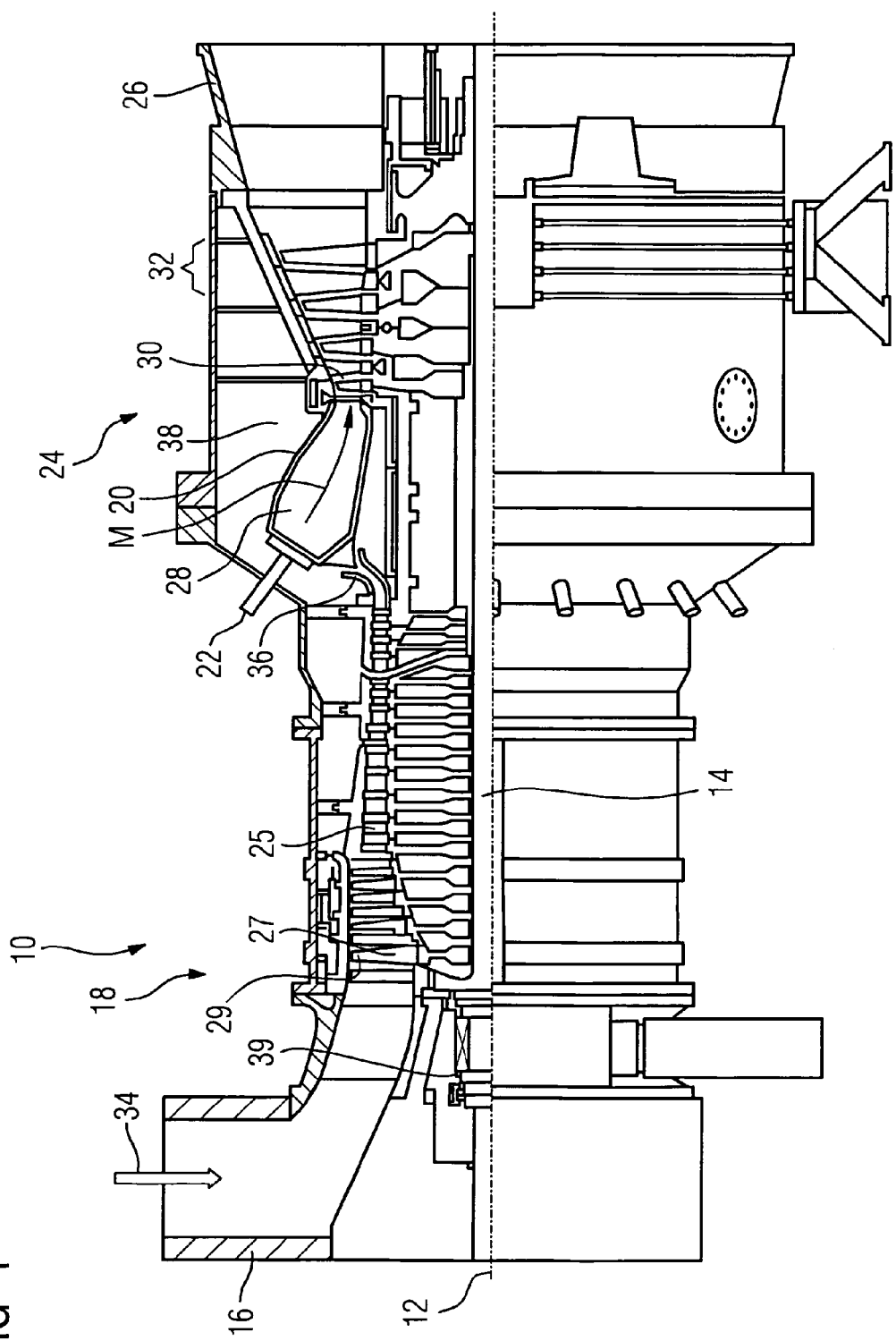
FIG. 1 shows a static gas turbine in a partial longitudinal cross section.

FIG. 1 shows a static gas turbine 10 in a partial longitudinal section. The gas turbine 10 has, in the interior, a rotor 14 which is mounted so as to be rotatable about an axis of rotation 12 and which is also referred to as turbine rotor. An intake housing 16, a compressor 18, a toroidal annular combustion chamber 20 with multiple burners 22 arranged rotationally symmetrically with respect to one another, a turbine unit 24 and an exhaust-gas housing 26 are arranged in succession along the rotor 14.

The compressor 18 comprises a compressor duct 25 which is of annular form and which has compressor stages, composed of rotor blade rings and guide blade rings, arranged in succession therein in a cascaded manner. The rotor blades 27 arranged on the rotor 14 are situated with the free-ended blade aerofoil tips 29 thereof opposite an outer duct wall of the compressor duct 25. The compressor duct 25 issues via a compressor outlet diffuser 36 into a plenum 38. Provided in said plenum is the annular combustion chamber 20 with its combustion space 28, the latter communicating with an annular hot-gas duct 30 of the turbine unit 24. Four turbine stages 32 connected in series with one another are arranged in the turbine unit 24. A generator or a working machine (neither of which are illustrated) is coupled to the rotor 14.

During the operation of the gas turbine 10, ambient air 34 as medium to be compressed is drawn in through the intake housing 16, and compressed, by the compressor 18. The compressed air is conducted through the compressor outlet diffuser 36 into the plenum 38, from where it flows into the burner 22. Fuel also passes via the burner 22 into the combustion space 28. There, with the addition of the compressed air, the fuel is burned to form a hot gas M. The hot gas M subsequently flows into the hot-gas duct 30, where it expands, exerting work on the turbine blades of the turbine unit 24. The energy released as a result is absorbed by the rotor 14 and utilized firstly for driving the compressor 18 and secondly for driving a working machine or electrical generator.

A compressor-side bearing 39 for the mounting of the rotor 14 is merely schematically indicated in FIG. 1.

Figure 2:
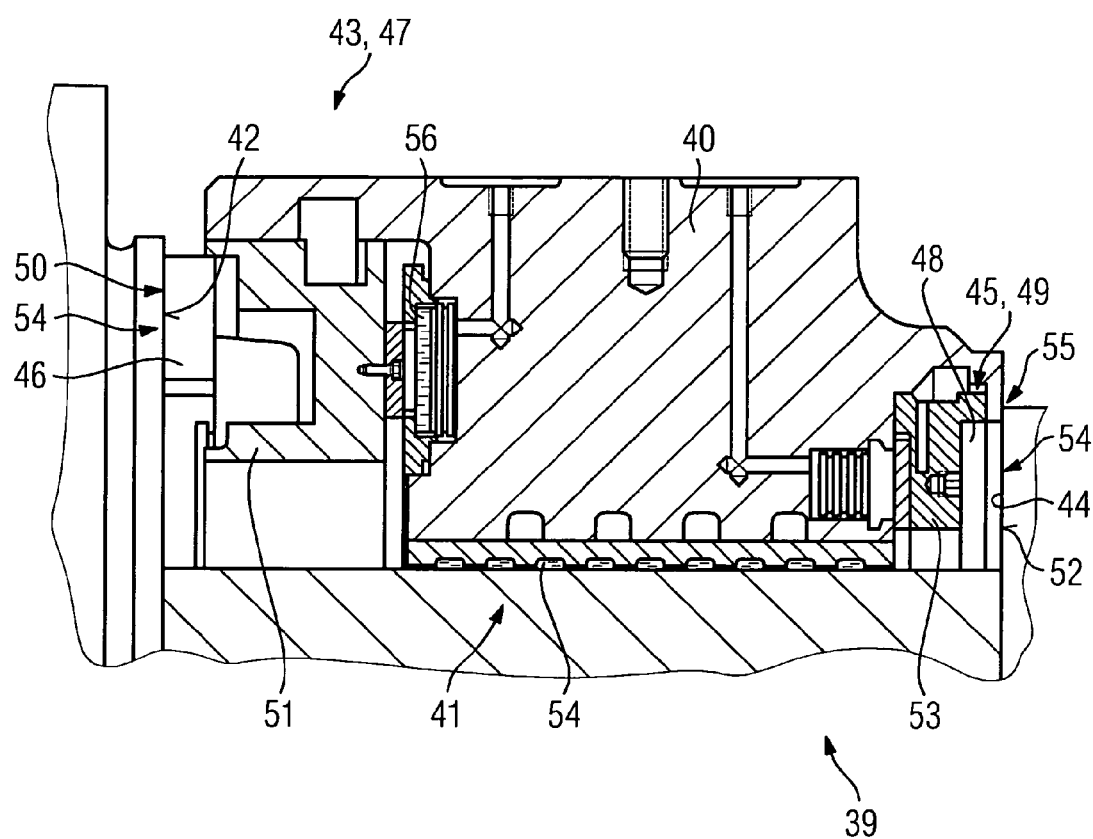
FIG. 2 shows a longitudinal section through a bearing of a rotary machine having a first and a second step bearing.

FIG. 2 illustrates the bearing 39 in detail in a longitudinal section. The bearing 39 comprises a central bearing body 40 in which two axial bearings 47, 49 and a radial bearing 41 are provided. The axial bearings 47, 49 are in this case in the form of a main step bearing and a secondary step bearing. The two axial bearings 47, 49 will hereinafter be referred to for short as main step 47 and secondary step 49 respectively, or jointly as steps 47, 49. All of the bearings 41, 47, 49 are in the form of hydrodynamic plain bearings.

The main step 47 comprises an element carrier 51 and multiple circumferentially distributed bearing elements 46 seated therein, which bearing elements have in each case one bearing surface 50. The bearing surfaces 50 of the bearing elements 46 are directly adjacent to the lateral rotor surface 42 Likewise, the secondary step 49 comprises an element carrier 53 with multiple circumferentially distributed bearing elements 48, which have in each case one bearing surface 52 facing the lateral rotor surface 44. The bearing elements 46, 48 can in this case, for the axial mounting of the rotor 14, be pressed against the rotor surfaces 42, 44 by means of hydraulic medium that acts on the element carriers 51, 53.

Figure 3:
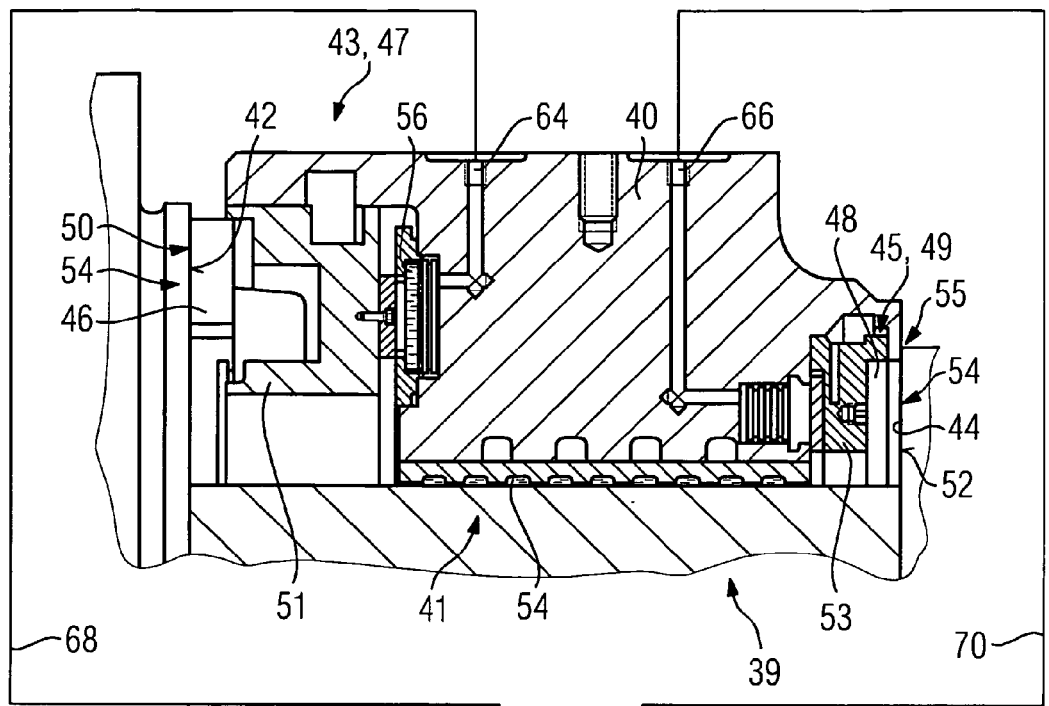
FIG. 3 shows the hydraulic system for the actuation of the hydraulic axial bearing as per FIG. 2.

For the actuation of the two step bearings 43, 45, a hydraulic system 60 (FIG. 3) is provided by means of which damping according to the invention of axial vibrations can be activated both when the rotor 14 is displaced and also when the rotor 14 is not displaced. Said hydraulic system 60 comprises a tank 62 for the hydraulic medium 61 and a line system for connecting the tank 62 to a supply port 64 of the main step 47 and to a supply port 66 of the secondary step 49. For each step 47, 49 there is provided a supply line 68, 70 with a multiplicity of valves for control. A first pump $P_1$ can provide the hydraulic medium 61 at a higher pressure $p_1$ than a second pump $P_2$. The latter provides hydraulic medium 61 at a relatively low pressure $p_2$. The adjustment of the pressures $p_1$, $p_2$ is realized by means of pressure-limiting valves 72, 74, the inlet-side ports of which are connected to the outlet-side ports of the pumps $P_1$, $P_2$. The pressure-limiting valves 72, 74 conduct the excess hydraulic medium 61 back into the tank 62.

A 4/2 directional valve $V_{12}$, which is connected at the inlet side to the outlet of the pump $P_1$, can supply hydraulic medium 61 at relatively high pressure $p_1$ via a shuttle valve $V_7$ to the main step 47 when an electric drive $K_1$ is activated, or via a shuttle valve $V_g$ to the secondary step 49 when an electric drive $K_2$ is activated. By means of two 3/2 directional valves $V_3$, $V_4$, it is possible, upon or after the occurrence of inadmissibly large axial vibration amplitudes of the rotor 14, for that step 47, 49 which is not supplied with a high pressure $p_1$ to be supplied with hydraulic medium 61 at relatively low pressure $p_2$ via the corresponding shuttle valve $V_7$, Vg. To activate the 3/2 directional valves $V_3$, $V_4$, the respectively associated electric drive $K_3$ and $K_4$ must be actuated.

Hydraulic medium flowing back from the steps 47, 49, such a flow occurring upon the deactivation of the axial displacement of the rotor 14 or upon the deactivation of the damping, is conducted via the 2/2 directional valves $V_5$, $V_6$, which are connected in each case in parallel with respect to the shuttle valves $V_7$ and $V_g$, and subsequently via the 4/2 directional valve $V_{12}$, back into the tank 62.

The valves $V_3$, $V_4$, $V_5$, $V_6$ are reset by means of spring force when the electric drives $K_x$ are deactivated. The electric drives are normally in the form of electromagnetic coils.

Figure 4:
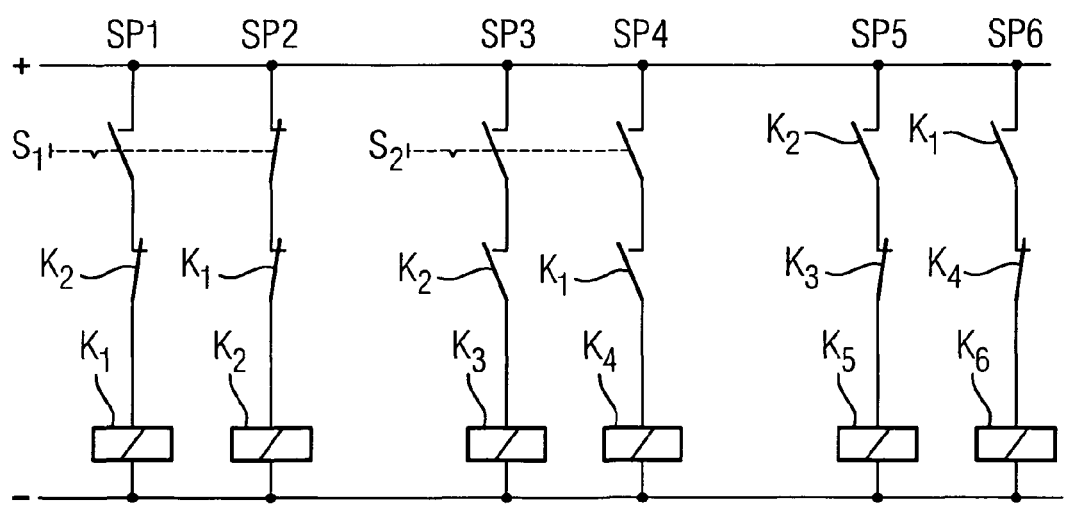
FIG. 4 shows an electrical circuit diagram for the activation of the hydraulic system as per FIG. 3.

FIG. 4 also shows the electrical circuit diagram for the activation of the electric drives $K_1$ to $K_6$ of the hydraulic system 60. The circuit diagram comprises six current paths SP1 to SP6. A changeover from operation with non-displaced rotor 14 to operation with displaced rotor 14 is effected by actuation of a switch S1. The damping of the rotor 14 can be activated by actuation of a switch S2, as will be explained in more detail below.

During the run-up of the gas turbine 10, the gas turbine rotor 14 is accelerated from 0 rpm to rated rotational speed. During this time, and also during the operation of the gas turbine 10, flow forces which act on the rotor 14 arise in the compressor 18 and also in the turbine unit 24. The axial components of said flow forces oppose one another and partially compensate one another. During the run-up, the resultant axial flow force initially displaces the rotor 14 in the direction of the intake housing 16. Only when a reversal rotational speed, which is slightly below the rated rotational speed, is reached is the resulting axial thrust force abruptly reversed, such that the rotor 14 is then displaced in the direction of the exhaust-gas housing 26. It is also the case during intended operation of the gas turbine that the rotor 14 is displaced in said direction by the flow forces of the hot gas M. Said direction is referred to as main thrust direction.

During the run-up and also during the operation of the gas turbine 10, there is a film of hydraulic medium 54 between the rotor 14 and the radial bearing 41.

For as long as the rotor 14 is displaced counter to the main thrust direction, the two surfaces 44, 52 are separated merely by a thin film of a hydraulic medium, for example hydraulic oil or turbine oil, for the axial mounting of said rotor. The rotor 14 and the secondary step 49 are then connected in a force-fitting manner, whereas there is an air gap (not illustrated in FIG. 2) between the bearing surface 50 and the rotor surface 42. This means that there is then no force-fitting coupling between the main step 47 and the rotor 14.

After the reversal rotational speed is reached, the axial mounting changes from the secondary step 49 to the main step 47. For this purpose, a hydrodynamically acting film of the hydraulic medium forms between the bearing surface 50 and rotor surface 42. At the same time, the secondary step 49 is relieved of load by virtue of an air gap 55 being formed between the bearing surface 52 and the rotor surface 44 (illustrated in FIG. 2).

At this time, neither switch S1 nor switch S2 is actuated, such that only drive $K_2$ is activated by means of the electrical circuit SP2.

The bearing element 46 is axially displaceable for the adjustment of radial gaps, wherein for the axial displacement, there is arranged in the bearing 39 an oil chamber 56 into which hydraulic oil at a relatively high pressure $p_1$ can be fed by actuation of the switch S1, such that a synchronous axial displacement of element carrier 51 and bearing elements 46 is realized. The relatively high pressure $p_1$ is realized by virtue of the pressure-limiting valve 72 being correspondingly set. The element carrier 51 has, in the direction of the oil chamber 56, in each case one sealing ring on an inner diameter and on an outer diameter. The bearing element 48 and the element carrier 53 that interacts therewith are likewise designed to be axially displaceable.

If the rotor 14 tends toward axial vibrations owing to combustion instabilities in part-load operation of the gas turbine 10, it is possible, in addition to the main step 47 as first step bearing 43 which is situated in the force flow (and is under load), for the secondary step 49 as second step bearing 45 to also be coupled in a force-fitting manner by simultaneous supply of the hydraulic medium into the gap between bearing surface 52 and rotor surface 44, with the aim of reducing the axial play of the rotor 14. For this purpose, the hydraulic medium of the second step bearing 45 must be at such a high pressure that a force additionally acting in the main thrust direction of the rotor 14 is exerted on the first step bearing 43 by the second step bearing 45 via the rotor 14. Said force dampens and limits the return swing of the rotor 14 counter to the flow direction of the hot gas M in the event of axial vibrations. In this way, damage both to the rotor 14 and also to bearing components of the gas turbine 10 situated in the force flow can be reliably prevented. To achieve this, S2 is actuated manually or automatically in the event of an inadmissibly large axial vibration being exceeded, whereby the drive $K_4$ then actuates the valve $V_4$. After the end of the axial vibration damping step, S2 is deactivated, whereby the drive $K_6$ actuates the valve $V_6$. In this way, the hydraulic medium of the secondary step 49 can flow off into the tank 62 via the line 70 and the valves $V_6$ and $V_{12}$.

If axial vibrations arise during the run-up, these can be damped by virtue of the main step 47 being activated in addition to the already-loaded secondary step 49. In this case, the switch S1 is not actuated and the switch S2 is actuated. The main step 47 then generates an additional force which exerts further load on the secondary step 49 via the rotor 14.

The method is self-evidently applicable not only to gas turbines but also to other rotary machines. Viewed as a whole, the invention thus relates to a method for operating a rotary machine having a rotor 14 which is mounted in a bearing 39, which rotor 14 is, at a time during operation, subjected to a thrust force which acts substantially only in an axial direction, said thrust force being absorbed and dissipated by a first step bearing 43 of the bearing 39 via sliding means, wherein the bearing 39 has a second step bearing 45. To specify methods in which the axial vibrations of the rotor 14 are dampened or even eliminated, it is proposed that, as the thrust force acts, the second step bearing 45 at least temporarily simultaneously generates a force that acts on the first step bearing 43 in the thrust direction. In this way, the rotor 14 is braced as viewed in the axial direction, wherein it self-evidently remains rotatably mounted during this time.

The invention claimed is:

1. A method for operating a rotary machine having a rotor which is mounted in a bearing, comprising:
    subjecting the rotor, at a time during operation, to a thrust force which acts substantially only in an axial direction, said thrust force being absorbed and dissipated by a first step bearing of the bearing via sliding means, and
    at least temporarily simultaneously generating, as the thrust force acts, by a second step bearing of the bearing, a force that acts on the first step bearing in the thrust direction.

2. The method as claimed in claim 1,
    wherein the force acting in the main thrust direction is activated only after or upon the occurrence of axial vibrations of the rotor.

3. The method as claimed in claim 1,
    wherein the method is implemented during transient operating states and/or during part-load operation of a rotary machine in the form of a turbomachine.

4. The method as claimed in claim 3,
    wherein the turbomachine is in the form of a static gas turbine.

5. The method as claimed in claim 1,
    wherein the method is implemented before and/or during an axial displacement of the rotor.

6. The method as claimed in claim 1 wherein the bearing is in the form of a hydraulic axial bearing.

7. A method for operating a rotary machine, the method comprising:
  reacting a thrust force in a rotor through a first bearing;
  imposing a further force onto the rotor through a second bearing in a same direction as the thrust force; and
  reacting the further force through the first bearing while simultaneously reacting the thrust force through the first bearing.

8. The method of claim 7, further comprising imposing the further force onto the rotor only during a period of transient operation of the rotary machine.

9. The method of claim 7, further comprising imposing the further force onto the rotor only during a period of part load operation of the rotary machine.

10. The method of claim 7, further comprising imposing the further force onto the rotor only upon occurrence of axial vibration of the rotor exceeding a threshhold value.

11. The method of claim 7, wherein the second bearing is a hydraulic axial bearing.

12. The method of claim 7, wherein the second bearing is a magnetic axial bearing.

13. A rotary machine comprising:
  a rotor disposed within a housing;
  a main step bearing disposed between the rotor and the housing and configured to react force in the rotor in a first axial direction;
  a secondary step bearing disposed between the rotor and the housing and configured to react force in the rotor in a second axial direction opposed the first axial direction;
  a first pump connected to provide hydraulic medium to the main step bearing to react a thrust force in the rotor through the main step bearing;
  a second pump connected to provide hydraulic medium to the secondary step bearing independently from the first pump providing hydraulic medium to the main step bearing; and
  a control arrangement configured to activate the second pump to impose a further force on the rotor in a same direction as the thrust force, and to activate the first pump to react the further force through the main step bearing while simultaneously reacting the thrust force through the main step bearing.

14. The rotary machine of claim 13, further comprising:
  the first pump configured to provide hydraulic medium to the main step bearing at a pressure $P_1$; and
  the second pump connected to provide hydraulic medium to the secondary step bearing at a pressure $P_2$ less than $P_1$.

* * * * *